United States Patent [19]

Morge et al.

[11] 4,067,588
[45] Jan. 10, 1978

[54] LADDER ASSEMBLY FOR CONSTRUCTION VEHICLES

[75] Inventors: Michael P. Morge, Oswego; Robert A. Shiffler, Geneva, both of Ill.

[73] Assignee: Caterpillar Tractor Co., Peoria, Ill.

[21] Appl. No.: 656,568

[22] Filed: Feb. 9, 1976

[51] Int. Cl.² .............................................. B60R 3/00
[52] U.S. Cl. .................................... 280/163; 182/93
[58] Field of Search ............ 280/163, 166; 105/443; 182/214, 93, 99, 178, 97; D15/23, 25; 9/1.6

[56] References Cited

U.S. PATENT DOCUMENTS

| D. 189,024 | 10/1960 | Bacon et al. ........................ D15/25 |
| D. 230,622 | 3/1974 | Conroy et al. ..................... D15/25 |
| D. 238,955 | 2/1976 | Peterson ........................... D15/23 X |
| 536,232 | 3/1895 | Potts .................................. 182/214 |
| 1,844,202 | 2/1932 | Campbell ............................. 182/93 |
| 2,722,360 | 11/1955 | Malm ................................ 182/214 |
| 3,232,376 | 2/1966 | Lucas et al. ........................ 182/97 |
| 3,869,022 | 3/1975 | Wallk ............................... 280/166 X |
| 3,967,695 | 7/1976 | Waddell ............................ 280/166 X |

FOREIGN PATENT DOCUMENTS 2,224,896  5/1972  Germany .............................. 280/163

Primary Examiner—Joseph F. Peters, Jr.
Assistant Examiner—Michael J. Forman
Attorney, Agent, or Firm—Phillips, Moore, Weissenberger, Lempio & Majestic

[57] ABSTRACT

A construction vehicle, such as a wheel-type loader, has a ladder assembly mounted on a side thereof for access to an operator's cab mounted on a platform of the vehicle. The ladder assembly comprises a pair of vertically disposed and parallel hand rails releasably attached to the side of the vehicle and a plurality of horizontally disposed and vertically spaced steps secured between the hand rails. Upper flared portions of the hand rails diverge upwardly and outwardly away from each other to form guide means to guide the feet of an operator descending from the platform onto an upper step of the ladder assembly.

8 Claims, 7 Drawing Figures

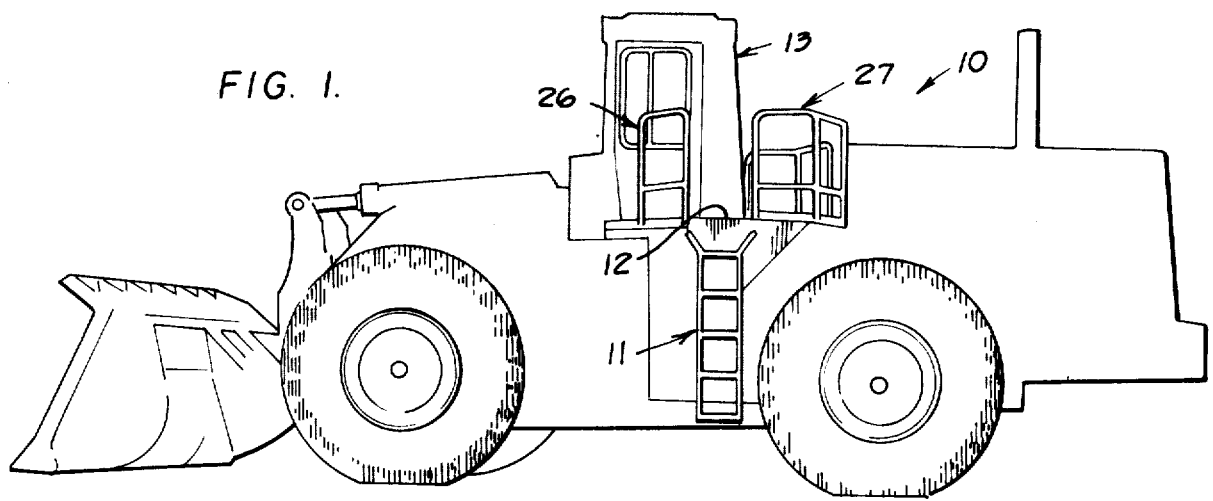
FIG. 1.
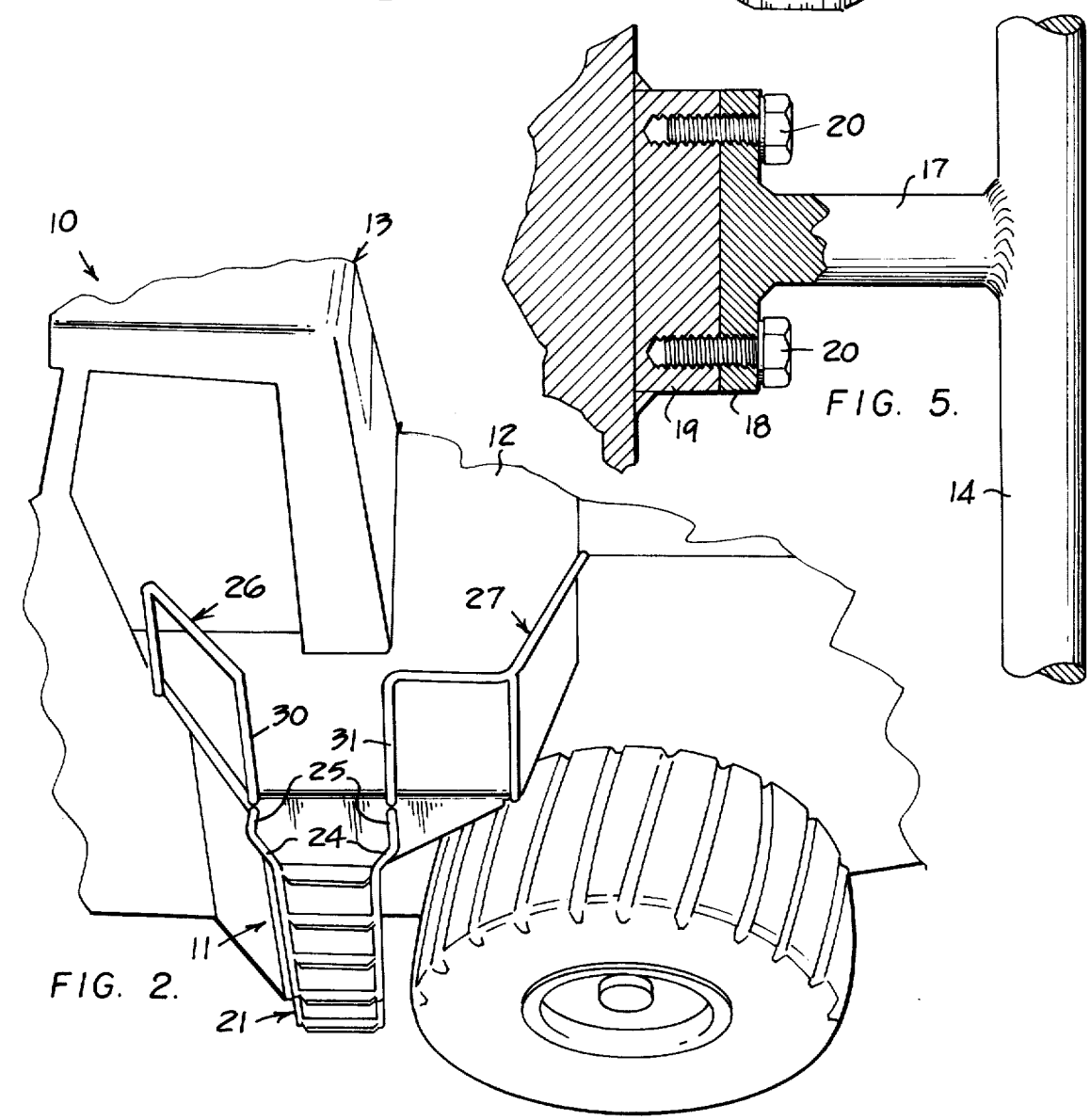
FIG. 2.
FIG. 5.

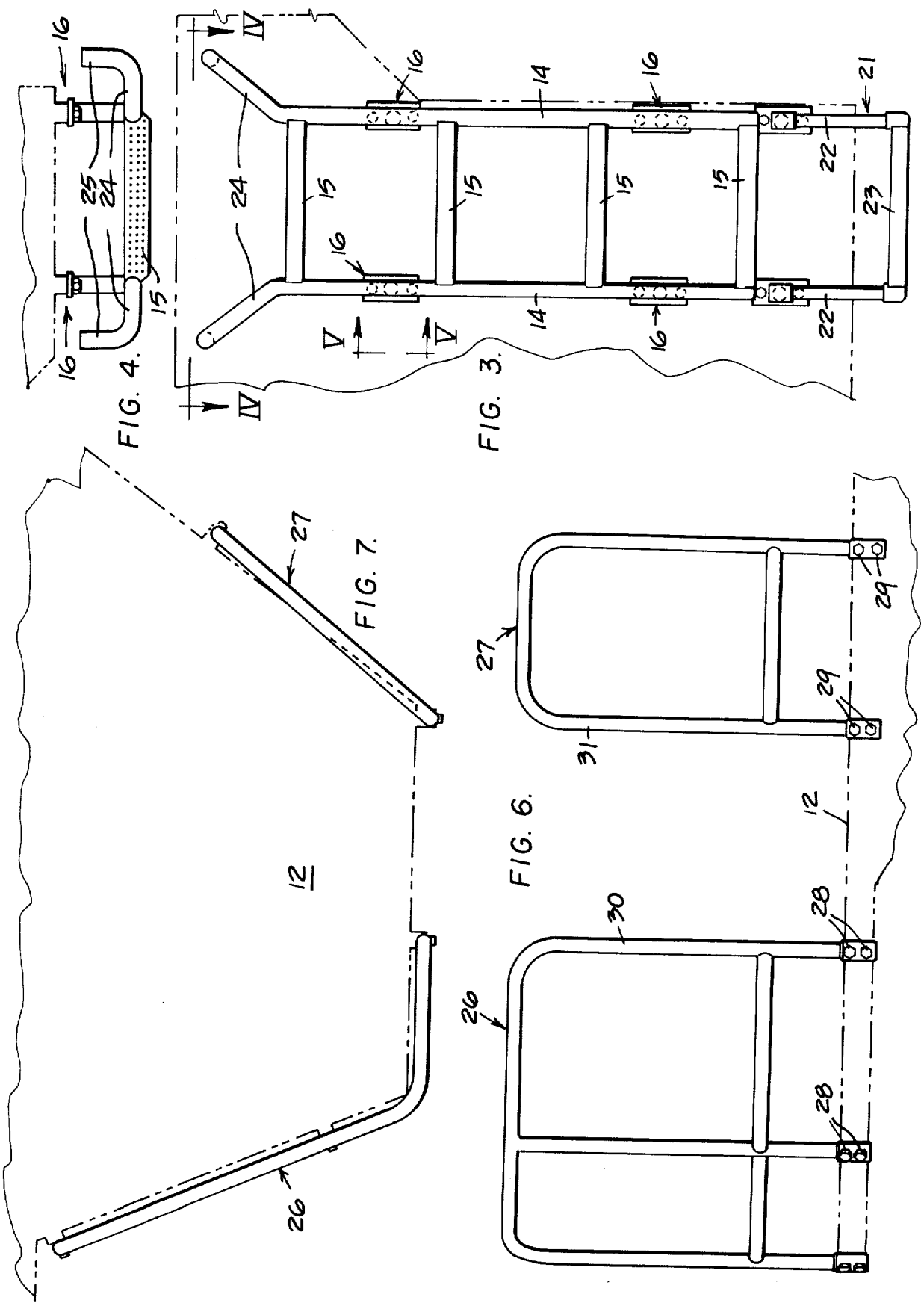

LADDER ASSEMBLY FOR CONSTRUCTION VEHICLES

BACKGROUND OF THE INVENTION

This invention relates to a ladder assembly detachably mounted on the side of a construction vehicle, such as a wheeltype loader, to facilitate access to an operator's cab mounted thereon. The ladder is normally welded or otherwise suitably secured to the side of the vehicle to permit ascent of an operator to a platform on which the cab is mounted. In addition, a plurality of hand rails are normally mounted on the platform to aid the operator in descending the ladder assembly.

SUMMARY OF THE INVENTION

An object of this invention is to provide an improved ladder assembly for construction vehicles which provides guide means for aiding an operator during descent thereon. The ladder assembly is detachably mounted on a side of the vehicle for repair or replacement purposes and provides access to an operator's cab mounted on a platform thereof. The ladder assembly comprises a pair of vertically disposed and parallel hand rails having a plurality of horizontally disposed and vertically spaced steps secured therebetween. Upper end portions of the hand rails, adjacent to the platform, diverge upwardly and outwardly away from each other to form the guide means for guiding the feet of an operator descending from the platform onto an upper step of the ladder assembly.

BRIEF DESCRIPTION OF THE DRAWINGS

Other objects of this invention will become apparent from the following description and accompanying drawings wherein:

FIG. 1 is a side elevational view of a wheel-type loader having the ladder assembly of this invention mounted on a side thereof;

FIG. 2 is an enlarged, top isometric view partially illustrating a platform of the loader associated with the ladder assembly and further illustrating a pair of hand rail assemblies mounted on the platform;

FIG. 3 is an enlarged front elevational view of the ladder assembly;

FIG. 4 is a top plan view of the ladder assembly, taken in the direction of arrows IV—IV in FIG. 3;

FIG. 5 is an enlarged partially sectioned view of the ladder assembly, taken in the direction of arrows V—V in FIG. 3, illustrating attachment means for attaching the ladder assembly to the side of the loader;

FIG. 6 is an enlarged front elevational view of the hand rail assemblies mounted on the platform of the loader; and FIG. 7 is a top plan view of such hand rail assemblies.

DETAILED DESCRIPTION

FIGS. 1 and 2 illustrate a wheel-type loader 10 having a ladder assembly 11 of this invention mounted on a side thereof. Although the hereinafter described ladder assembly finds particular application to such a loader, it should be understood that it may find further utility on other construction vehicles. In addition, although a single ladder assembly is shown attached to one side of the loader, it should be understood that such ladder assembly may be duplicated on the opposite side thereof.

The loader further comprises a horizontally disposed platform 12 having an operator's cab 13 mounted thereon in a conventional manner. Referring to FIGS. 3–5, the ladder assembly comprises a pair of vertically disposed and parallel hand rails 14 having a plurality of horizontally disposed and vertically spaced steps 15 suitably secured therebetween. Each hand rail is releasably attached to the side of the loader by a pair of vertically spaced attachment means 16, more clearly detailed in FIG. 5.

Each attachment means comprises a tubular support 17 to space the ladder assembly outwardly from the vehicle. The support has an elongated mounting plate 18 secured to its inner end. The mounting plate abuts a mounting block 19 and is releasably attached thereto by a pair of bolts 20 disposed on either side of support 17. The block may be welded or otherwise suitably secured to the side of the loader.

As shown in FIG. 3, a flexible step assembly 21 may be attached to the side of the vehicle in vertical alignment below ladder assembly 11. The step assembly may comprise a pair of vertically disposed and parallel straps 22 composed of a suitably reinforced elastomeric material and releasably attached to the loader at their upper ends by attachment means similar to that illustrated in FIG. 5. A rigid and horizontally disposed step 23 is secured between the lower ends of straps 22 and is disposed adjacent to ground level to facilitate ascent of the ladder assembly by the operator.

As further shown in FIGS. 3 and 4, uppr flared portions 24 of hand rails 14 terminate adjacent to platform 12 and diverge upwardly and outwardly away from each other. Such flared portions thus form guide means for guiding the feet of an operator descending from the platform onto an upper step 15 of the ladder assembly. The hand rails terminate at horizontally disposed and parallel upper end portions 25 which extend inwardly towards the loader from the upper ends of flared portions 24.

Referring to FIGS. 2, 6 and 7, a pair of reinforced upper hand rails assemblies 26 and 27 are vertically disposed on peripheral portions of platform 12 and have their lower ends suitably secured thereon by bolts 28 and 29, respectively. Vertically disposed and parallel inner supports 30 and 31 for the respective hand rail assemblies are spaced apart horizontally to provide an opening for the ingress of the operator therethrough. The supports are disposed in substantial vertical alignment with respect to end portions 25 of the ladder assembly to aid the operator in his guided descent onto the ladder assembly.

We claim:

1. A construction vehicle comprising
    a horizontally disposed platform mounted on a top of said vehicle,
    an operator's station mounted on said platform, and
    a vertically disposed ladder assembly rigidly mounted on a side of said vehicle and terminating at an upper end thereof closely adjacent to said platform, said ladder assembly comprising
    a pair of vertically disposed and parallel hand rails, attachment means releasably attaching each of said hand rails to the side of said vehicle,
    a plurality of horizontally disposed and vertically spaced steps secured between and to said hand rails, and
    upper flared portions formed on said hand rails to terminate at lower ends thereof at an upper step of said ladder assembly and at upper ends thereof adjacent to said platform and diverging upwardly and outwardly away from each other to form guide means for guiding the feet of an operator descending from said platform directly onto said upper step of said ladder assembly, said steps thus terminating at the upper flared portions formed on said hand rails to provide an unobstructed area between said upper flared portions.

2. The construction vehicle of claim 1 wherein said attachment means comprises a support secured to a respective one of said hand rails to space said ladder assembly outwardly from said vehicle and releasable fastening means releasably attaching said support to the side of said vehicle.

3. The construction vehicle of claim 2 wherein said attachment means further comprises a mounting plate secured to an inner end of said support and a mounting block secured on the side of said vehicle, said fastening means comprising a plurality of bolts threadably attaching said mounting plate to said mounting block.

4. The construction vehicle of claim 3 wherein a vertically spaced pair of said attachment means releasably attach each of said hand rails to the side of said vehicle.

5. The construction vehicle of claim 1 further comprising a step assembly disposed in vertical alignment below said ladder assembly and attached to the side of said vehicle.

6. The construction vehicle of claim 5 wherein said step assembly comprises a pair of flexible straps having upper ends thereof secured to the side of said vehicle and further having a horizontally disposed step secured between and to lower ends of said straps.

7. The construction vehicle of claim 1 wherein each of said hand rails further comprises a horizontally disposed upper end portion extending inwardly towards said vehicle from an upper end of a respective one of said flared portions.

8. The construction vehicle of claim 7 further comprising vertically disposed hand rail assemblies secured on said platform and each having a vertically disposed support spaced horizontally from the support of the other one of said hand rail assemblies and further disposed in substantial vertical alignment with respect to an upper end portion of a respective one of said hand rails.

* * * * *